US012167220B2

(12) United States Patent
Ramo et al.

(10) Patent No.: US 12,167,220 B2
(45) Date of Patent: Dec. 10, 2024

(54) AUDIO REPRESENTATION AND ASSOCIATED RENDERING

(71) Applicant: Nokia Technologies Oy, Espoo (FI)

(72) Inventors: Anssi Ramo, Tampere (FI); Lasse Laaksonen, Tampere (FI); Sujeet Shyamsundar Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 101 days.

(21) Appl. No.: 17/802,780

(22) PCT Filed: Feb. 10, 2021

(86) PCT No.: PCT/FI2021/050089
§ 371 (c)(1),
(2) Date: Aug. 26, 2022

(87) PCT Pub. No.: WO2021/170903
PCT Pub. Date: Sep. 2, 2021

(65) Prior Publication Data

US 2023/0085918 A1 Mar. 23, 2023

(30) Foreign Application Priority Data

Feb. 28, 2020 (GB) ...................................... 2002900

(51) Int. Cl.
*H04R 5/02* (2006.01)
*H04S 3/00* (2006.01)
*H04S 7/00* (2006.01)

(52) U.S. Cl.
CPC ................ *H04S 7/30* (2013.01); *H04S 3/008* (2013.01); *H04S 2400/01* (2013.01);
(Continued)

(58) Field of Classification Search
CPC ........ H04S 7/30; H04S 3/008; H04S 2400/01; H04S 2400/11; H04S 2400/13; H04S 2400/15
(Continued)

(56) References Cited

U.S. PATENT DOCUMENTS

| | | | | |
|---|---|---|---|---|
| 2015/0149187 A1 | 5/2015 | Kastner et al. | ..................... | 19/8 |
| 2017/0289720 A1 | 10/2017 | Tsukagoshi | ........................... | 3/8 |

(Continued)

FOREIGN PATENT DOCUMENTS

| | | |
|---|---|---|
| GB | 2575509 A | 1/2020 |
| JP | 2004538727 A | 12/2004 |

(Continued)

OTHER PUBLICATIONS

"IVAS design constraints from an end-to-end perspective", Dolby Laboratories Inc., 3GPP TSG-SA#100 meeting, S4(18)1099, Oct. 2018, 12 pages.

*Primary Examiner* — Ammar T Hamid
(74) *Attorney, Agent, or Firm* — Harrington & Smith

(57) ABSTRACT

An apparatus for immersive audio communication including circuitry configured to: receive at least a first audio data stream and a second audio data stream, wherein at least one of the first and second audio stream includes a spatial audio stream to enable immersive audio during a communication; determine a type of each of the first and second audio streams to identify which of the received first and second audio data streams the spatial audio stream; process the second audio data stream with at least one parameter dependent on the determined type; and render the first audio data stream and the processed second audio data stream.

20 Claims, 9 Drawing Sheets

(52) U.S. Cl.
CPC ....... *H04S 2400/11* (2013.01); *H04S 2400/13* (2013.01); *H04S 2400/15* (2013.01)

(58) Field of Classification Search
USPC .................................................. 381/303, 300
See application file for complete search history.

(56) References Cited

U.S. PATENT DOCUMENTS

| | | | |
|---|---|---|---|
| 2017/0302995 A1 | 10/2017 | Tsukagoshi | 65/80 |
| 2018/0114534 A1 | 4/2018 | Tsukagoshi | 19/8 |
| 2019/0103118 A1 | 4/2019 | Atti et al. | |
| 2020/0013426 A1* | 1/2020 | Sen | G10L 19/18 |

FOREIGN PATENT DOCUMENTS

| | | | |
|---|---|---|---|
| JP | 2015527611 | A | 9/2015 |
| WO | WO 03/015414 | A1 | 2/2003 |
| WO | WO-2016/035731 | A1 | 6/2017 |
| WO | WO-2016/052191 | A1 | 7/2017 |
| WO | WO-2016/060101 | A1 | 7/2017 |
| WO | WO-2016/171002 | A1 | 2/2018 |
| WO | WO-2019/105575 | A1 | 6/2019 |
| WO | WO 2020/152394 | A1 | 7/2020 |
| WO | WO 2020/193852 | A1 | 10/2020 |

* cited by examiner

Figure 5A/
501
503
Acoustic metadata
PCM
505
Figure 5B/
507
Object audio bitstream
Figure 5C/
509
511
Stream ID = 000001
Stream type = 0
513
Object audio bitstream
515
Figure 5D/
517
519
Stream ID = 000002
521
Stream type = 1
523
Stream description = MASA
MASA format bitstream
525

811
813
815
817
819
801
801
813
831
833
835
Payload header
Stream ID = 000001
Stream type = 0
Payload
Payload = E.g., 5.1
Stream type = 1
Payload = E.g., MASA
Payload = E.g., stereo

AUDIO REPRESENTATION AND ASSOCIATED RENDERING

CROSS REFERENCE TO RELATED APPLICATION

This patent application is a U.S. National Stage application of International Patent Application Number PCT/FI2021/050089 filed Feb. 10, 2021, which is hereby incorporated by reference in its entirety, and claims priority to GB 2002900.5 filed Feb. 28, 2020.

FIELD

The present application relates to apparatus and methods for sound-field related audio representation and associated rendering, but not exclusively for audio representation for an audio encoder and decoder.

BACKGROUND

Immersive audio codecs are being implemented supporting a multitude of operating points ranging from a low bit rate operation to transparency. An example of such a codec is the immersive voice and audio services (IVAS) codec which is being designed to be suitable for use over a communications network such as a 3GPP 4G/5G network. Such immersive services include uses for example in immersive voice and audio for applications such as virtual reality (VR), augmented reality (AR) and mixed reality (MR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Furthermore parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

SUMMARY

There is provided according to a first aspect an apparatus comprising means configured to: receive at least a first audio data stream and a second audio data stream, wherein at least one of the first and second audio stream comprises a spatial audio stream to enable immersive audio during a communication; determine a type of each of the first and second audio streams to identify which of the received first and second audio data streams comprises the spatial audio stream; process the second audio data stream with at least one parameter dependent on the determined type; and render the first audio data stream and the processed second audio data stream.

The second audio data stream may be configured to comprise at least one further audio data stream, and wherein the at least one further audio data stream may comprise a determined type, and the at least one further audio data stream may be an embedded level audio data stream with respect to the second audio data stream.

The at least one further audio data stream may comprise at least one further embedded level, wherein each embedded level may comprise at least one additional audio data stream with a determined type.

The second audio data stream may be a master level audio data stream.

Each audio data streams may be further associated with at least one of: a stream identifier configured to uniquely identify the audio data stream; and a stream descriptor configured to describe the type of the audio data stream.

The type may be one of: a mono audio signal type; an immersive voice and audio services audio signal.

The at least one parameter may be configured to define a room characteristic or scene description.

The at least one parameter defining a room characteristic or scene description may comprise at least one of: direction; direction azimuth; direction elevation; distance; gain; spatial extent; energy ratio; and position.

The means may be further configured to: receive an additional audio data stream; embed the additional audio data stream within one or other of the first audio data stream and the second audio data stream.

According to a second aspect there is provided a method for an apparatus, the method comprising: receiving at least a first audio data stream and a second audio data stream, wherein at least one of the first and second audio stream comprises a spatial audio stream to enable immersive audio during a communication; determining a type of each of the first and second audio streams to identify which of the received first and second audio data streams comprises the spatial audio stream; processing the second audio data stream with at least one parameter dependent on the determined type; and rendering the first audio data stream and the processed second audio data stream.

The second audio data stream may be configured to comprise at least one further audio data stream, and wherein the at least one further audio data stream may comprise a determined type, and the at least one further audio data stream may be an embedded level audio data stream with respect to the second audio data stream.

The at least one further audio data stream may comprise at least one further embedded level, wherein each embedded level may comprise at least one additional audio data stream with a determined type.

The second audio data stream may be a master level audio data stream.

Each audio data streams may be further associated with at least one of: a stream identifier configured to uniquely identify the audio data stream; and a stream descriptor configured to describe the type of the audio data stream.

The type may be one of: a mono audio signal type; an immersive voice and audio services audio signal.

The at least one parameter may be configured to define a room characteristic or scene description.

The at least one parameter defining a room characteristic or scene description may comprise at least one of: direction; direction azimuth; direction elevation; distance; gain; spatial extent; energy ratio; and position.

The method may further comprise: receiving an additional audio data stream; embedding the additional audio data stream within one or other of the first audio data stream and the second audio data stream.

According to a third aspect there is provided an apparatus comprising at least one processor and at least one memory including a computer program code, the at least one memory and the computer program code configured to, with the at least one processor, cause the apparatus at least to: receive at least a first audio data stream and a second audio data stream, wherein at least one of the first and second audio stream comprises a spatial audio stream to enable immersive audio during a communication; determine a type of each of the first and second audio streams to identify which of the received first and second audio data streams comprises the spatial audio stream; process the second audio data stream with at least one parameter dependent on the determined type; and render the first audio data stream and the processed second audio data stream.

The second audio data stream may be configured to comprise at least one further audio data stream, and wherein the at least one further audio data stream may comprise a determined type, and the at least one further audio data stream may be an embedded level audio data stream with respect to the second audio data stream.

The at least one further audio data stream may comprise at least one further embedded level, wherein each embedded level may comprise at least one additional audio data stream with a determined type.

The second audio data stream may be a master level audio data stream.

Each audio data streams may be further associated with at least one of: a stream identifier configured to uniquely identify the audio data stream; and a stream descriptor configured to describe the type of the audio data stream.

The type may be one of: a mono audio signal type; an immersive voice and audio services audio signal.

The at least one parameter may be configured to define a room characteristic or scene description.

The at least one parameter defining a room characteristic or scene description may comprise at least one of: direction; direction azimuth; direction elevation; distance; gain; spatial extent; energy ratio; and position.

The apparatus may be further caused to: receive an additional audio data stream; embed the additional audio data stream within one or other of the first audio data stream and the second audio data stream.

According to a fourth aspect there is provided an apparatus comprising receiving circuitry configured to receive at least a first audio data stream and a second audio data stream, wherein at least one of the first and second audio stream comprises a spatial audio stream to enable immersive audio during a communication; determining circuitry configured to determine a type of each of the first and second audio streams to identify which of the received first and second audio data streams comprises the spatial audio stream; processing circuitry configured to process the second audio data stream with at least one parameter dependent on the determined type; and rendering circuitry configured to render the first audio data stream and the processed second audio data stream.

According to a fifth aspect there is provided a computer program comprising instructions [or a computer readable medium comprising program instructions] for causing an apparatus to perform at least the following: receive at least a first audio data stream and a second audio data stream, wherein at least one of the first and second audio stream comprises a spatial audio stream to enable immersive audio during a communication; determine a type of each of the first and second audio streams to identify which of the received first and second audio data streams comprises the spatial audio stream; process the second audio data stream with at least one parameter dependent on the determined type; and render the first audio data stream and the processed second audio data stream.

According to a sixth aspect there is provided a non-transitory computer readable medium comprising program instructions for causing an apparatus to perform at least the following: receive at least a first audio data stream and a second audio data stream, wherein at least one of the first and second audio stream comprises a spatial audio stream to enable immersive audio during a communication; determine a type of each of the first and second audio streams to identify which of the received first and second audio data streams comprises the spatial audio stream; process the second audio data stream with at least one parameter dependent on the determined type; and render the first audio data stream and the processed second audio data stream.

According to a seventh aspect there is provided an apparatus comprising: means for receiving at least a first audio data stream and a second audio data stream, wherein at least one of the first and second audio stream comprises a spatial audio stream to enable immersive audio during a communication; means for determining a type of each of the first and second audio streams to identify which of the received first and second audio data streams comprises the spatial audio stream; means for processing the second audio data stream with at least one parameter dependent on the determined type; and means for rendering the first audio data stream and the processed second audio data stream.

According to an eighth aspect there is provided a computer readable medium comprising program instructions for causing an apparatus to perform at least the following: receive at least a first audio data stream and a second audio data stream, wherein at least one of the first and second audio stream comprises a spatial audio stream to enable immersive audio during a communication; determine a type of each of the first and second audio streams to identify which of the received first and second audio data streams comprises the spatial audio stream; process the second audio data stream with at least one parameter dependent on the determined type; and render the first audio data stream and the processed second audio data stream.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
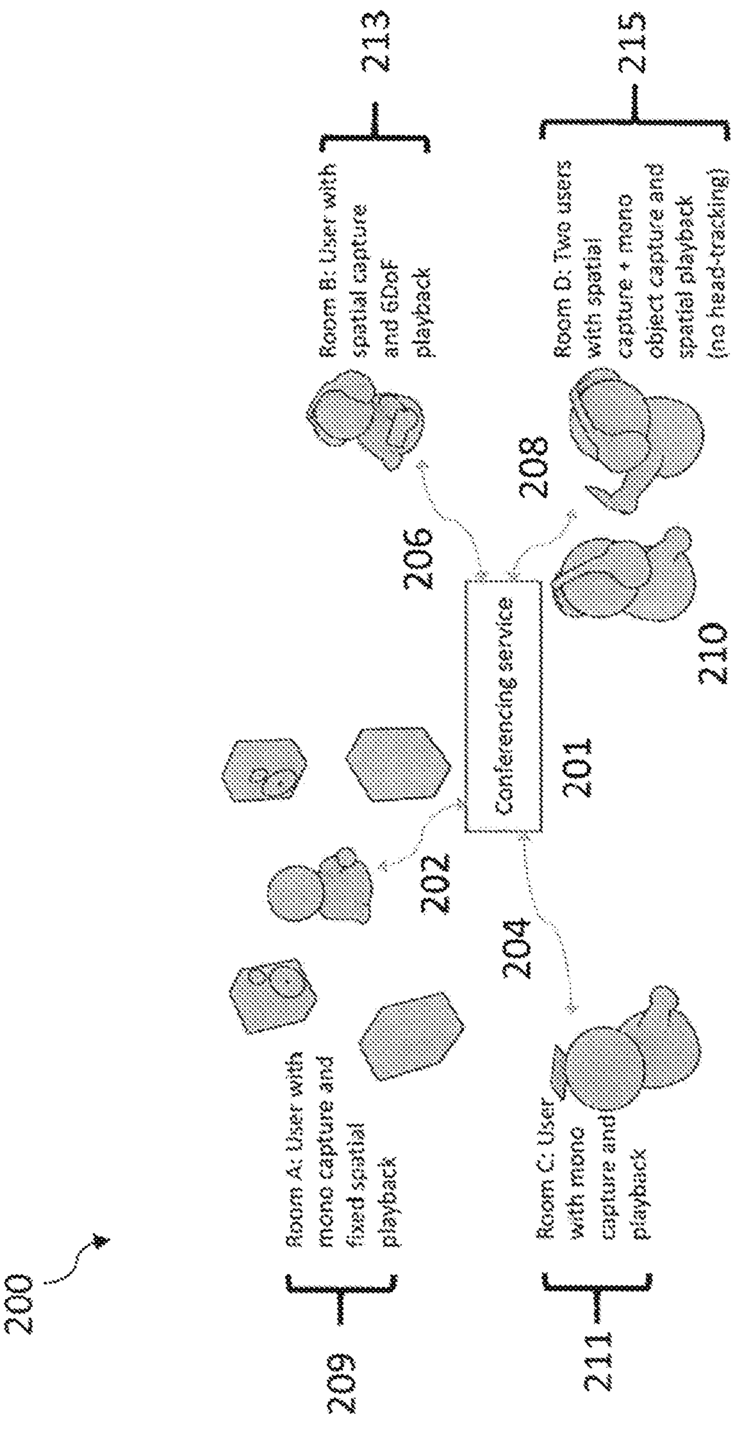
FIG. 1 shows schematically an example conferencing system suitable for employing some embodiments.

The following describes in further detail suitable apparatus and possible mechanisms to embed spatial stream(s) as object streams(s) and send the spatial stream as-is as an object to the receiving participant. The object metadata is updated based on the spatial scene. In other words the object stream type is itself another audio stream with respective object metadata generated by a processing element. This operation can be performed by a suitable device (e.g., mobile, user equipment—UE) that receives more than one input format or, for example a conference bridge (e.g. multi-point control unit—MCU).

The invention relates to immersive audio codecs capable of supporting many input audio formats, immersive audio scene representations, and services where incoming encoded audio may be, e.g., mixed, re-encoded and/or forwarded to listeners.

The IVAS codec discussed above is an extension of the 3GPP EVS codec and intended for new real-time immersive voice and audio services over 4G/5G. Such immersive services include, e.g., immersive voice and audio for virtual reality (VR) and augmented reality (AR). The multi-purpose audio codec is expected to handle the encoding, decoding and rendering of speech, music and generic audio. It is expected to support channel-based audio and scene-based audio inputs including spatial information about the sound field and sound sources. It is also expected to operate with low latency to enable conversational services as well as support high error robustness under various transmission conditions.

The IVAS encoder is configured to be able to receive an input in a supported format (and in some allowed combination of the formats). Similarly, it is expected that the decoder can output the audio in a number of supported formats. A pass-through mode has been proposed, where the audio could be provided in its original format after transmission (encoding/decoding).

There have been proposed methods describing object-based audio being implemented as an acceptable format for an IVAS codec configured to process spatial metadata combined with a suitable (mono) audio signal(s) and which can be rendered to the user. The metadata parameters can be, for example, captured from a real environment with help from any visual or auditory tracking method, or any other modality. In some embodiments radio based technology can be used to generate metadata. e.g. Bluetooth, Wifi or GPS locator technologies can be used to get object coordinates. Orientation data can be received in some embodiments using sensors such as magnetometer, accelerometer and/or gyrometer. Also other sensors such as proximity sensors can be used to generate scene relevant metadata from the real environment.

Alternatively, the metadata can be created artificially according to the defined virtual scene, for example, by a teleconferencing bridge or by a user equipment (e.g., smartphone). For example, a user may set or indicate some desired acoustic features via a suitable UI.

In some embodiments the object-based audio spatial metadata can be defined as one or more objects where each object may be defined by parameters such as Azimuth, Elevation, Distance, Gain and Spatial Extent.

Furthermore Metadata-assisted spatial audio (MASA) is a parametric spatial audio format and representation. On high level, it can be considered a representation consisting of 'N channels+spatial metadata'. It is a scene-based audio format particularly suited for spatial audio capture on practical devices, such as smartphones, where spherical arrays for FOA/HOA capture are not realistic or convenient. The idea is to describe the sound scene in terms of time- and frequency-varying sound source directions. Where no directional sound source is detected, the audio is described as diffuse. In MASA (as currently proposed for IVAS), there can be one or two directions for each time-frequency (TF) tile. The spatial metadata is described relative to the directions and can include, e.g., spatial metadata for each direction and common spatial metadata that is independent of the directions.

For example the spatial metadata relative to the directions may comprise parameters such as a direction index, a direct-to-total energy ratio, a spread coherence, and distance. The spatial metadata that is independent of the directions may comprise parameters such as Diffuse-to-total energy ratio, Surround coherence, and Remainder-to-total energy ratio.

An example use case for IVAS is for AR/VR teleconferencing. There each participant may have his/her own object, which can be freely panned in 3D space. In the teleconferencing scenario the conference bridge may, for example, receive several IVAS streams from multiple participants. These streams are then combined to a common stream, for example, using objects for at least each active participant. Alternatively, a pre-rendered spatial scene may be created and for example represented as MASA or FOA/HOA audio formats. If objects are used, the incoming object or other mono stream (for example an EVS stream) can be directly copied to be an object stream of the out-going common conference stream by attaching a suitable metadata representation to the waveform. This may or may not include a re-encoding of the audio waveform. However, if the participant is sending a spatial audio stream such MASA or HOA, the conference bridge has to then decode all incoming IVAS streams and reduce the stream(s) to mono, before sending it downstream as a (mono) audio object.

A further use case is one where a user is capturing a scene (for example making a live pod-cast video) with a mobile device on fixed stand that has spatial audio capture enabled. Additionally a headset or some other form of close-up microphone can be used to enhance a voice recording. The close-up capture device is also capable to capture spatial audio for example with binaural capture from the headset or MASA from the spatial audio capable lavalier microphone. The close-up captured voice may then be added to the device captured IVAS spatial audio stream as an object stream. The object location and distance can be conveniently captured for example using a suitable location beacon attached to the close-up capture device. When only a mono object is allowed in IVAS the device has to down-mix the spatial stream coming from the close-up capture to mono, before embedding it to the IVAS stream. The embodiments as described herein attempt to avoid or minimise added latency and complexity and furthermore attempts to increase the maximum achievable quality.

Some embodiments as described herein thus increase the flexibility for various IVAS audio inputs in audio source mixing and forwarding. For example in AR/VR teleconferencing and other immersive use cases.

Additionally in some embodiments there is substantially less delay and complexity, avoiding generating down-mix spatial stream(s) at the AR/VR conference bridge or the capturing device. Additionally there is no loss of original input properties and or quality loss for the converted audio formats.

In some embodiments the decoder is configured to have an interface output format, a so-called pass-through mode, to have external renderers with more capability than normal integrated renderer to act as output mode.

With respect to FIG. 1 is shown an example system within which some embodiments may be implemented. The system 200 shows a conferencing scenario where some participants are sending mono and some spatial streams and some participants have mono, some spatial, and some even 6 DoF rendering and playback capabilities. For example as shown in FIG. 1 in room A 209 a user 202 is employing mono capture and fixed spatial playback, in room B 213 the user 206 is employing spatial capture and 6 DoF (Degrees of freedom) playback, in room C 211 the user 204 is employing mono capture and playback, and in room D 215 the users 208 and 210 are employing spatial capture and mono object capture and spatial playback but with no head-tracking. A conferencing service 201 connects all of the users.

The system as shown in FIG. 1 has users operating apparatus with different capabilities and the embodiments as described herein attempt to optimize the experiences for the users without requiring the conferencing service 201 to decode, mix, and encode the various inputs separately. In the embodiments as described herein any decisions related to level of immersiveness. For example in some embodiments the apparatus can be implemented at a receiving UE.

Thus, in some embodiments the (IVAS) object stream can be configured to comprise another "objectified" (IVAS) data stream. Furthermore, object metadata is configured to contain information, whether the object is a (mono) object-based audio representation (e.g., EVS stream with spatial metadata) or full IVAS spatial stream (e.g., MASA or stereo or even object containing IVAS) that can be given object-like metadata (e.g., positional metadata). In such embodiments any "objectified" (IVAS) data stream may contain another (IVAS) object. These (IVAS) objects can be moved around to be part of any other (IVAS) object or the "main" (IVAS) data stream. Any object metadata is then updated so that it stays meaningful for the whole newly formed IVAS stream. Furthermore, in some embodiments the rest of the object metadata fields are updated according to the spatial scene description.

In such embodiments a higher quality and lower delay for conference bridge use cases, where incoming audio streams are spatial captured/created are expected. Furthermore some embodiments may be implemented in use cases where there is a main spatial audio captured by, e.g., mobile phone (UE) and additional spatial audio object(s) are captured by wireless microphones to, e.g., enhance the voice capture benefit similarly and allows (IVAS) encoding on a new class of devices (wireless microphones) without need to decode the audio at the UE to allow further encoding. Instead, the stream can be simply embedded as is.

Before discussing the embodiments further, we initially discuss the systems for obtaining and rendering spatial audio signals which may be used in some embodiments.

With respect to FIG. 2 is shown example apparatus employed within the system as shown in FIG. 1 and suitable for implementing some embodiments as described herein.

Figure 2A:
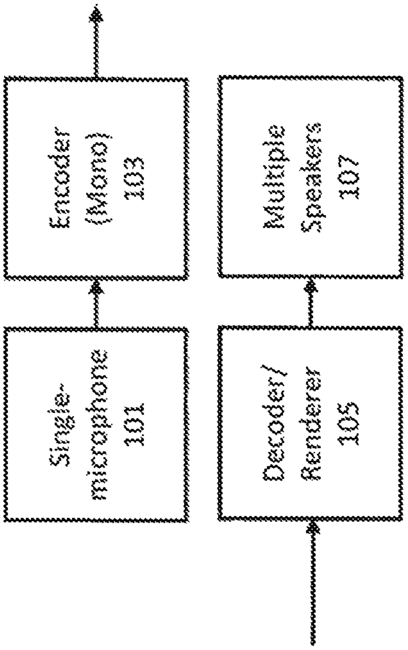
FIGS. 2*a* to 2*d* show schematically systems of apparatus suitable for implementing some embodiments.

FIG. 2A shows for example the apparatus suitable for implementing some embodiments with respect to the user in Room A. In this example the apparatus comprises a single microphone 101 configured to generate a mono audio signal which is passed to an encoder 103. The apparatus furthermore comprises an encoder 103 configured to receive the mono audio signal and encode the mono audio signal prior to transmitting to a suitable conferencing network.

FIG. 2A furthermore shows a decoder/renderer 105 which is configured to receive an encoded spatial/mono audio signal which is decoded and rendered into suitable audio signal outputs which are passed to multiple speakers 107 to output the spatial audio signals to the user.

Figure 2B:
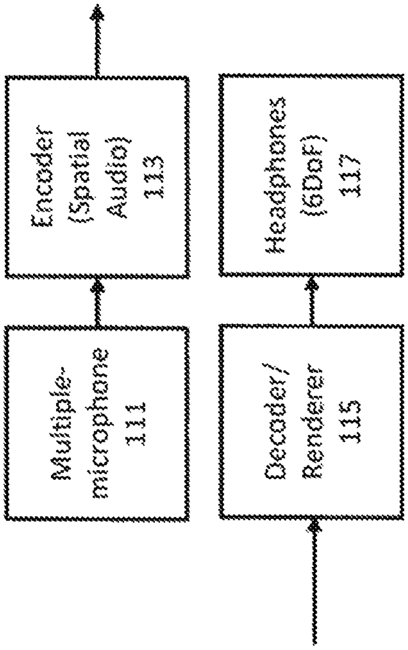

FIG. 2B shows furthermore example apparatus suitable for implementing some embodiments with respect to the user in Room B. In this example the apparatus comprises a multiple microphone 111 audio input configured to generate multiple audio signals which can be used to generate a spatial audio signal which is passed to an encoder 113. The apparatus furthermore comprises an encoder 113 configured to receive the spatial audio signal and encode the spatial audio signal prior to transmitting to a suitable conferencing network.

FIG. 2B furthermore shows a decoder/renderer 115 which is configured to receive an encoded spatial/mono audio signal which is decoded and rendered into suitable audio signal outputs which are passed to headphones equipped with headtracker/locators 117 to output the spatial audio signals to the user and to pass the user location to the decoder/renderer 115 to control the rendering.

Figure 2C:
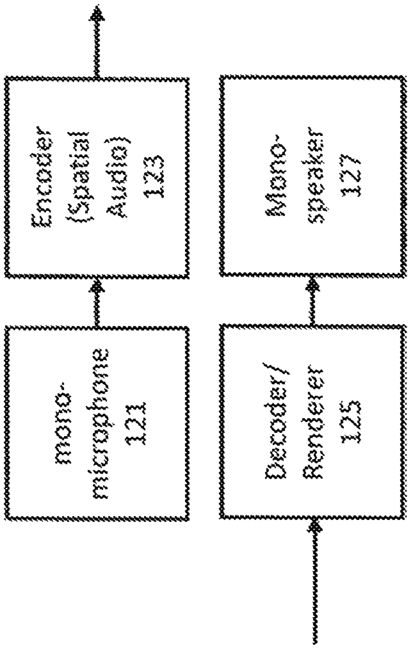

FIG. 2C shows example apparatus suitable for implementing some embodiments with respect to the user in Room C. In this example the apparatus comprises a mono microphone 121 audio input configured to generate a mono audio signal which can be used to generate a mono audio signal which is passed to an encoder 123. The apparatus furthermore comprises an encoder 123 configured to receive the mono audio signal and encode the mono audio signal as a spatial audio signal prior to transmitting to a suitable conferencing network.

FIG. 2C furthermore shows a decoder/renderer 125 which is configured to receive an encoded spatial/mono audio signal which is decoded and rendered into suitable audio signal outputs which are passed to mono-speaker 127 to output the audio signals to the user.

Figure 2D:
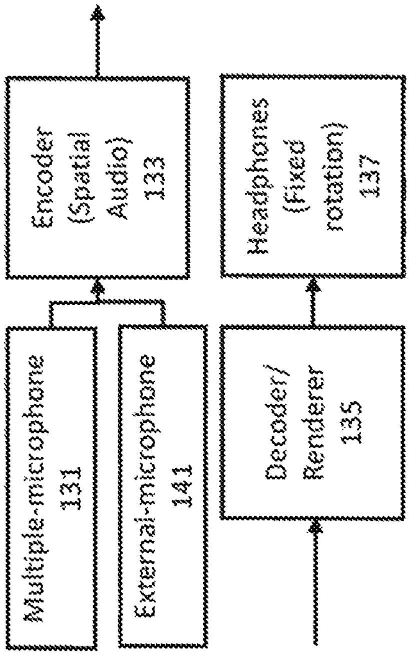

FIG. 2D shows furthermore example apparatus suitable for implementing some embodiments with respect to the user in Room D. In this example the apparatus comprises a multiple microphone 131 audio input configured to generate multiple audio signals and an external microphone (for example a mono-microphone or multiple-microphone) which can be used to generate a spatial audio signal and external mono/spatial audio signal which is passed to an encoder 133. The apparatus furthermore comprises an encoder 133 configured to receive the spatial/mono audio signals and encode the spatial/mono audio signal prior to transmitting to a suitable conferencing network.

FIG. 2D furthermore shows a decoder/renderer 135 which is configured to receive an encoded spatial/mono audio signal which is decoded and rendered into suitable audio signal outputs which are passed to headphones 137 to output the spatial audio signals to the user.

Figure 3:
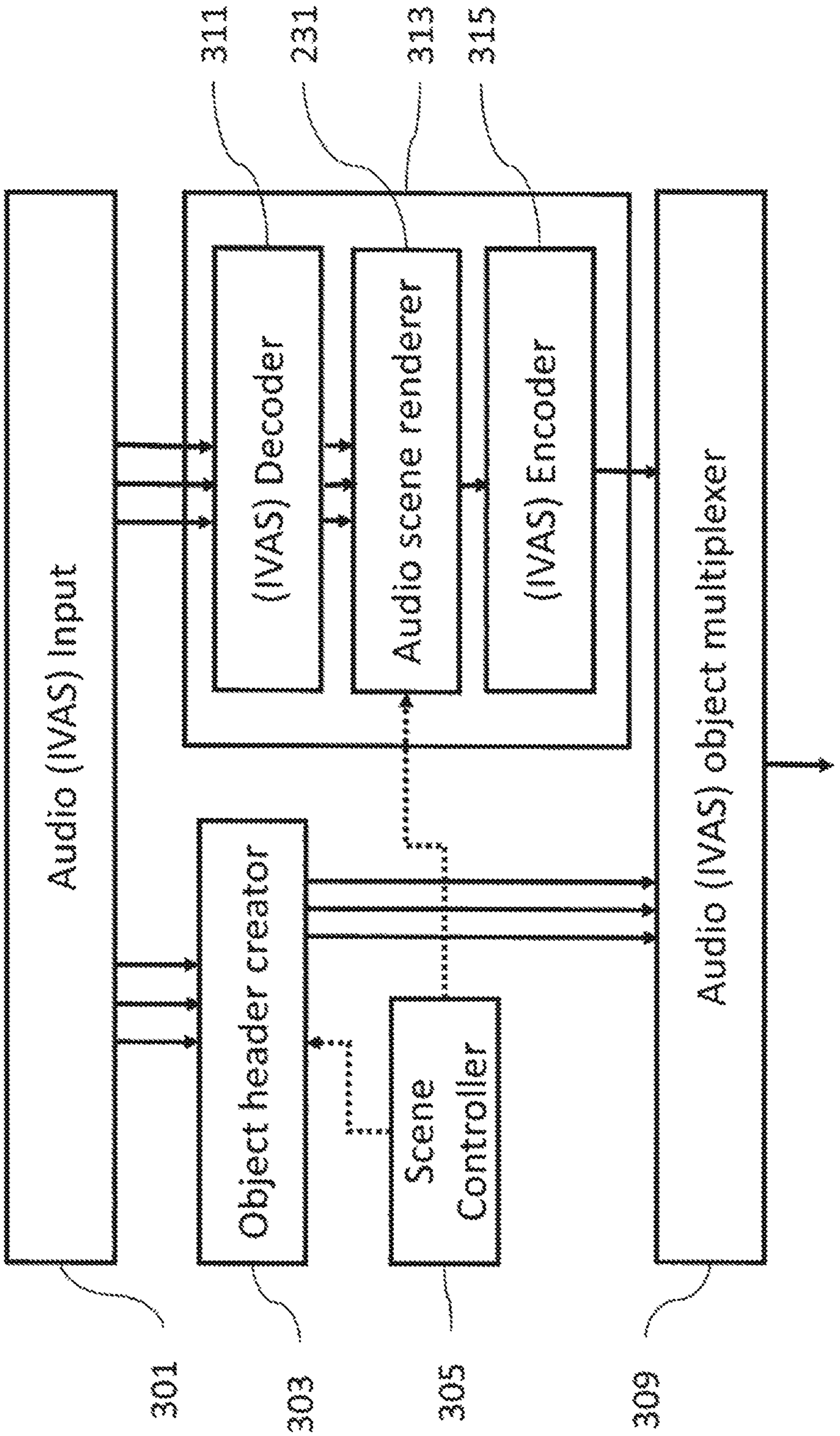
FIG. 3 shows schematically a bitstream-object-bitstream converter according to some embodiments.

With respect to FIG. 3 is shown a high-level view of an example (IVAS) encoder 103/113/123/133 which including the various inputs which may, as non-exclusive examples, be expected for the codec.

The encoder 103/113/123/133 in some embodiments comprises an audio (IVAS) input 301. The audio input 301 is configured to be able to receive one or more sets of spatial data (IVAS) streams from multiple sources either local or remote. The source(s) may be local, for example, more than one spatial capture devices in a known spatial configuration in the location of the encoder and/or multiple remote participants sending spatial IVAS streams. The audio input 301 is configured to pass the audio data stream to an object header creator 303 and to a (IVAS) decoder 311 as part of an IVAS datastream processor 313.

The encoder 103/113/123/133 in some embodiments comprises a scene controller 305 configured to control the processing of the received audio input 301.

For example in some embodiments the encoder 103/113/123/133 comprises an object header creator 303. The object header creator 303, controlled by the scene controller 305 is configured to insert each data stream as an object to the "master" data stream. In some embodiments the object header creator 305 may furthermore be configured to add missing object parameters such as distance and direction based on either true spatial configuration or a virtually defined scene.

In some embodiments the object header creator 303 is configured to determine if any inserted data stream contains objects, move those audio objects freely to be either directly part of "master" IVAS stream and update their metadata, or move the object under any other IVAS object. Additionally the object header creator 303 is configured to update the object metadata so that it is correct for the whole spatial configuration.

The encoder 103/113/123/133 in some embodiments comprises an IVAS datastream processor 313. The IVAS datastream processor 313 may comprise a (IVAS) decoder 311. The (IVAS) decoder 311 is configured to receive the one or more sets of spatial audio data streams and decode the spatial audio signals and pass them to an audio scene renderer 231.

The IVAS datastream processor 313 may comprise an audio scene renderer 231 configured to receive the audio signals and generate an audio scene rendering based on the decoded (IVAS) spatial audio signals. The audio scene rendering may constitute, e.g., a downmix of the various inputs from the (IVAS) decoder 311. The rendered audio scene audio signals may then be passed to an encoder 315.

The IVAS datastream processor 313 may comprise an encoder 315 which receives the rendered spatial audio signals and encodes them. In other words the IVAS datastream processor 313 is configured to decode all or at least some incoming datastreams and generate a common spatial scene, e.g., using IVAS MASA, IVAS HOA/FOA or IVAS mono objects.

In some embodiments where there are multiple embedded objects these can then be sent for those receivers, which have with high capability rendering available. The rest of the recipients receive only the pre-rendered spatial scene. Alternatively, a combination of at least one "IVAS stream object" and a pre-rendered "spatial scene IVAS stream object" can be used to reduce bit rate.

Additionally the encoder comprises an audio object multiplexer 309 configured to combine the objects and output a combined object datastream.

Figure 4:
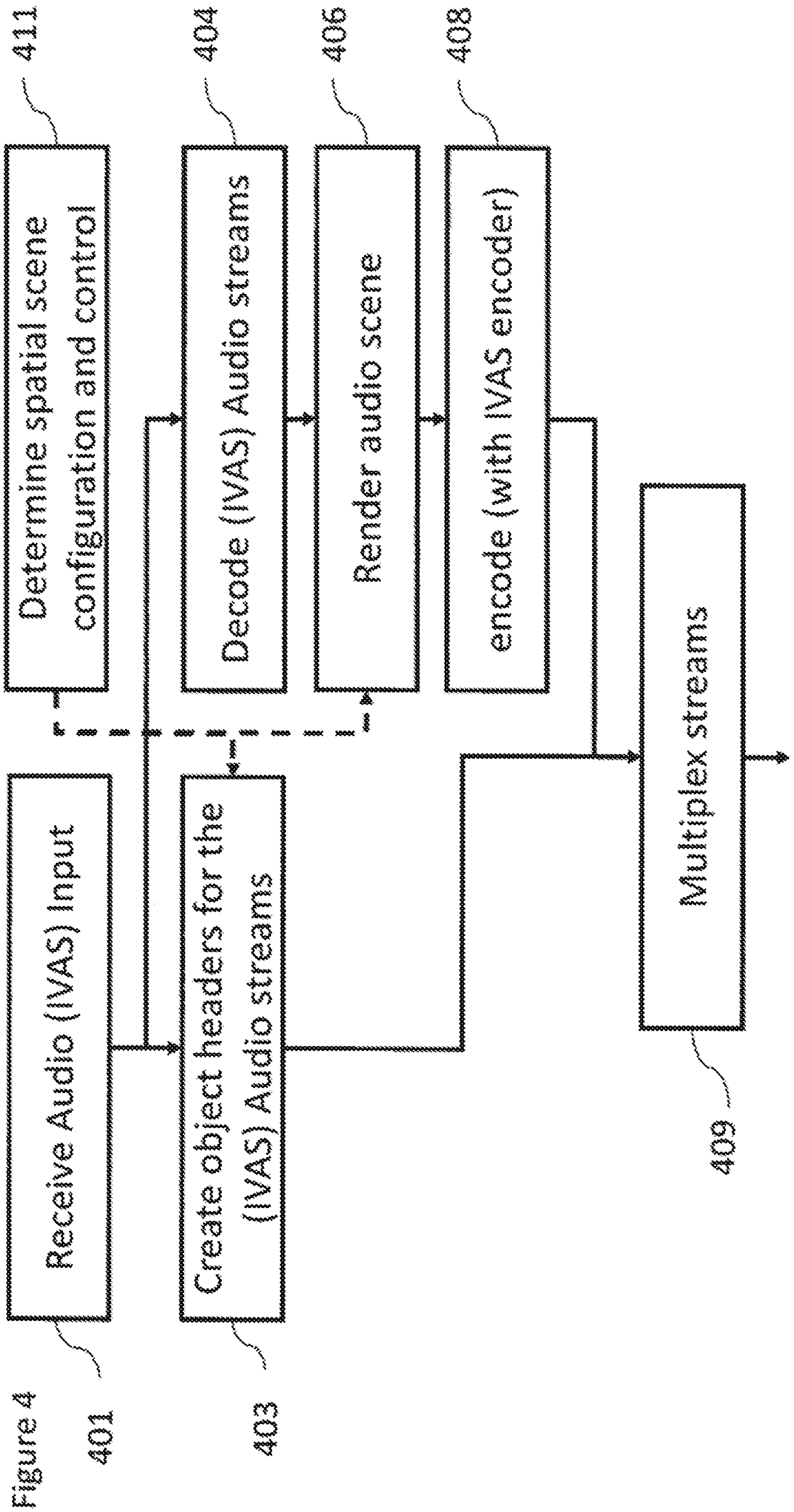
FIG. 4 shows schematically a flow diagram of operations of the bitstream-object-bitstream converter as shown in FIG. 3 according to some embodiments.

The operations of the encoder are furthermore shown by a flow diagram in FIG. 4.

The audio (IVAS) data streams are received in FIG. 4 at step 401.

Additionally the spatial scene configuration and control is determined in FIG. 4 at step 411.

Based on the determined spatial scene configuration and control and the input audio data streams object headers for the audio data streams are created as shown in FIG. 4 by step 403.

Furthermore, optionally, the data stream is decoded based on the determined spatial scene configuration and control and the input audio data streams as shown in FIG. 4 by step 404.

The decoded data streams may then be rendered as shown in FIG. 4 by step 406.

The rendered audio scene is then encoded using a suitable (IVAS) encoder as show in FIG. 4 by step 408.

The data streams can then be multiplexed and output as shown in FIG. 4 by step 409.

The IVAS object stream metadata may utilize any suitable acoustic/spatial metadata. An example of which is provided in the following table.

| Field | Bits | Description |
|---|---|---|
| Azimuth | 12 | Azimuth in degree with a resolution of 0.1 degree |
| Elevation | 12 | Elevation in degree with a resolution of 0.1 degree |
| Distance | 8 | Distance of the sound originating from the direction index in meters on a logarithmic scale. Range of values: for example, 0 to 100 m. |
| Gain | 8 | Mixing gain for the object. Applied in synthesis and intended for allowing input, transmission, and synthesis with optimal SNR. Range of values: [0.0, 1.0] |
| Spatial extent | 8 | Cue for synthesizing the spatial extent of the object. Parameter signifies range from point source to completely surrounding the listener. |

However, in some embodiments other positional information, such as x-y-z or cartesian coordinates may be employed instead of azimuth-elevation-distance. For example, a further configuration may be provided by the table

| Field | Bits | Description |
|---|---|---|
| Position | x | Audio object x-y-z position in 3D space |

However, some minimum stream description metadata is additionally required to signal the (IVAS) object data stream configuration information. For example, this information may be signaled using the following format.

| Field | Bits | Description |
|---|---|---|
| Stream ID | x | Stream ID provides a unique identification (for the session) of the audio stream. |
| Stream type | 1 | '0' Default. The object stream is regular mono object. '1' Advanced. The object stream is full IVAS object stream. |

Figure 5:
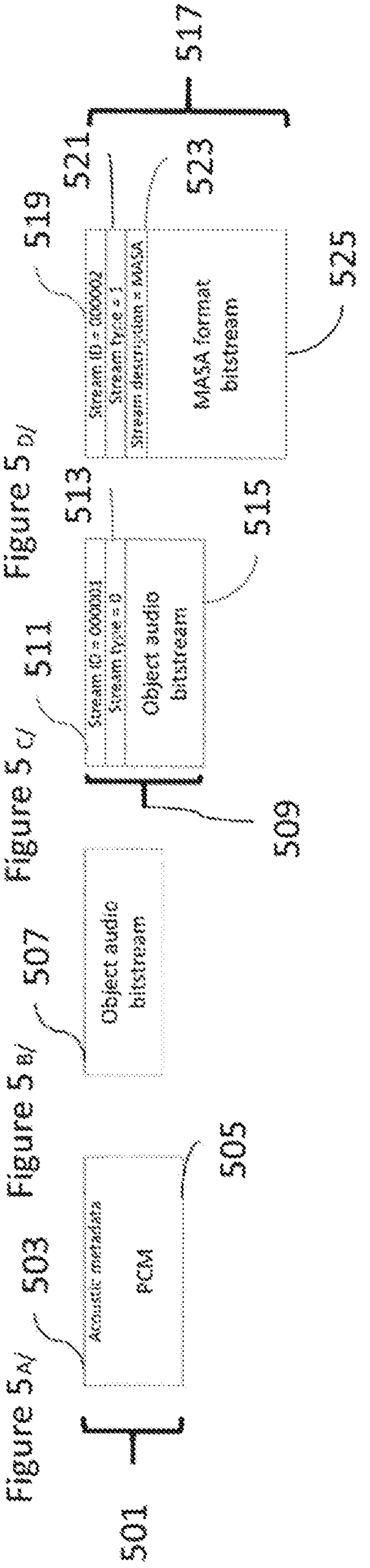
FIGS. 5*a* to 5*d* show example object formats according to some embodiments.

In such embodiments a 'Stream ID' parameter is used to uniquely identify in the current session each IVAS object stream. Thus, it can be signaled each original and mixed audio component (input stream). For example, the signaling allows identification of the component in a system or on a user interface. A 'Stream type' parameter defines the meaning of each "audio object". In some embodiments, an audio object is thus not only an object-based audio input. Rather, the object data stream can be an object-based audio (input) or it can be any IVAS scene. This for example is shown in FIG. 5, where three types of objects are shown.

For example in FIG. 5A a simple traditional (mono) audio object 501 is shown. The audio object 501 is defined in terms of a PCM audio signal part 505 and acoustic (spatial) metadata part 503. It is understood additional metadata could be present.

With respect to FIG. 5B there is shown an encoded representation 507 of the same audio object as shown in FIG. 5A.

FIG. 5C shows the same audio object as shown in FIGS. 5A and 5B but processed according to some embodiments as discussed herein. The processed audio object is described as an object data stream 509 which is defined by a 'Stream type=0' parameter 513. In other words, the object data stream 509 comprises a data stream identifier which identifies that it is an object-based audio IVAS object stream. Additionally, the object data stream 509 comprises an object audio bitstream part 515 (the encoded representation of the audio object) and a stream identifier 511 uniquely identifying the object data stream.

FIG. 5D shows a further (IVAS) object data stream 517. The further object data stream 517 comprises an identifier part 521 with 'Stream type=1'. In some embodiments a Stream type=0 corresponds to "simple" object type. e.g. mono signal. Furthermore in some embodiments a Stream type=1 corresponds to potentially "complex" streams. For example in this example the Stream type=1 corresponds to a full IVAS stream and in this case it contains MASA spatial stream. Since IVAS may contain one or more object stream, this allows nested objects. If stream type=0, it is known that there are no further objects and also that the stream is of simple type (in practice a mono object).

The further object data stream 517 can furthermore comprise an explicit stream description part 523, or the stream contents may be determined by starting to decode the object stream. In this case, it is explicitly described as a MASA-based scene (e.g., 'Stream description=MASA').

Additionally, the further object data stream 517 comprises an MASA format bitstream part 525 (the encoded representation of the audio object) and a stream identifier 519 'Stream ID=000002' uniquely identifying the object data stream.

A first advantage of the approach discussed herein is that IVAS inputs can often be conveniently forwarded without decoding/encoding operations. For example, there are no decoding/encoding operations required where a mixer device, a teleconferencing bridge (e.g., an AR/VR conference server), or other entity used to combine and/or forward audio inputs is present in the IVAS end-to-end service. Thus, by re-allocating a received (encoded) input as an IVAS object stream, the complexity and delay of the operation is reduced. For example, where the playback capability of the receiver is unknown, a server may optimize complexity by simply providing the received scene as is. Any IVAS stream can be decoded and rendered as mono to support even the simplest IVAS device. Also skipping any decoding/encoding operation at an intermediate point (e.g., conferencing server) reduces the end-to-end delay for that audio component. The user experience is thus improved.

Furthermore, the embodiments are configured such that there are only shallow embedded "objectified" IVAS streams. In other words where there is an object stream which also contains an object (and therefore may comprise multiple levels of object) a deep data structure is avoided and thus the decoder complexity is reduced. Thus the embedding as proposed in some embodiments permits an IVAS object to comprise another IVAS object, in other words although an IVAS objects can be two or more levels deep any "deep" object can in some embodiments be moved to an "upper level" object closer to the "master" IVAS stream and its metadata can be updated so that its representation stays meaningful for the newly formed scene. In some embodiments the IVAS object can be moved to be part of another IVAS object. So, the object is moved "deeper". This may allow, for example, encoding or decoding of audio objects (e.g., mono objects) together in order to save complexity or bit rate. If the formats of same type are at different levels in the structure, they generally need be encoded/decoded at different times or using different instances. This may introduce additional complexity.

Furthermore, the embodiments as discussed herein may have a second advantage in that it is possible to conveniently nest IVAS object streams, for example, for content distribution purposes. In such embodiments a more complex scene can be handled as a single (mono) audio object. An example nested packetization is presented in FIG. 6. This can be used, e.g., to distribute decoding complexity. This is very useful, e.g., for edge cloud services.

Figure 6:
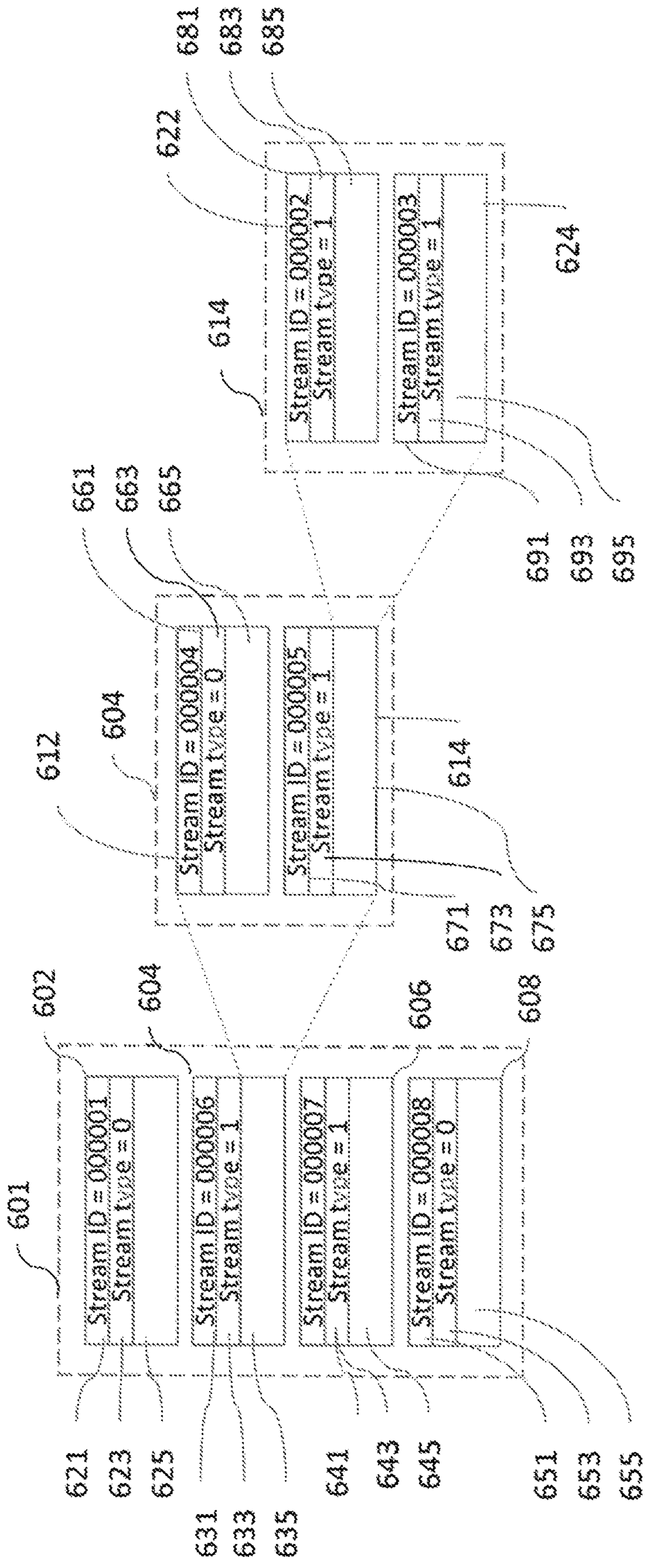
FIG. 6 shows example object nesting according to some embodiments.

Thus, for example FIG. 6 shows a whole scene object data stream 601. The whole scene object data stream 601 comprises multiple object data streams 602, 604, 606 and 608. For example, the first object data stream 602 comprises a stream ID 621 (Stream ID=000001) uniquely identifying the object data stream, a stream type identifier 623 (Stream type=0) and a data part 625. The second object data stream 604 comprises a stream ID 631 (Stream ID=000006) uniquely identifying the object data stream, a stream type identifier 633 (Stream type=1) and a data part 635. The third object data stream 606 comprises a stream ID 641 (Stream ID=000007) uniquely identifying the object data stream, a stream type identifier 643 (Stream type=1) and a data part 645. The fourth object data stream 608 comprises a stream ID 651 (Stream ID=000008) uniquely identifying the object data stream, a stream type identifier 653 (Stream type=0) and a data part 655.

Furthermore, as shown in FIG. 6 the second object data stream 604 furthermore comprises nested object data streams 612 and 614. These may for example be object data streams associated with a sub-section of the whole scene. The fifth object data stream 612 comprises a stream ID 661 (Stream ID=000004) uniquely identifying the object data stream, a stream type identifier 663 (Stream type=0) and a data part 665. The sixth object data stream 614 comprises a stream ID 671 (Stream ID=000005) uniquely identifying the object data stream, a stream type identifier 673 (Stream type=1) and a data part 675.

Additionally, the nested sixth object data stream 614 furthermore comprises further nested object data streams 622 and 624. These may for example be object data streams associated with a sub-sub-section of the sub-section of the whole scene. The seventh object data stream 622 comprises a stream ID 681 (Stream ID=000002) uniquely identifying the object data stream, a stream type identifier 683 (Stream type=1) and a data part 685. The eighth object data stream 624 comprises a stream ID 691 (Stream ID=000003)

uniquely identifying the object data stream, a stream type identifier 693 (Stream type=1) and a data part 695.

A further advantage in implementing some embodiments is that any IVAS input or IVAS scene that does already comprise a spatial parameter for example positional properties can determine such properties. For example, this can be implemented by adding acoustic spatial metadata (for example one of the parameters from the earlier tables) to an IVAS object stream ('Stream type=1'). This enables enhanced experiences, e.g., in AR/VR teleconferencing use cases.

Figure 7:
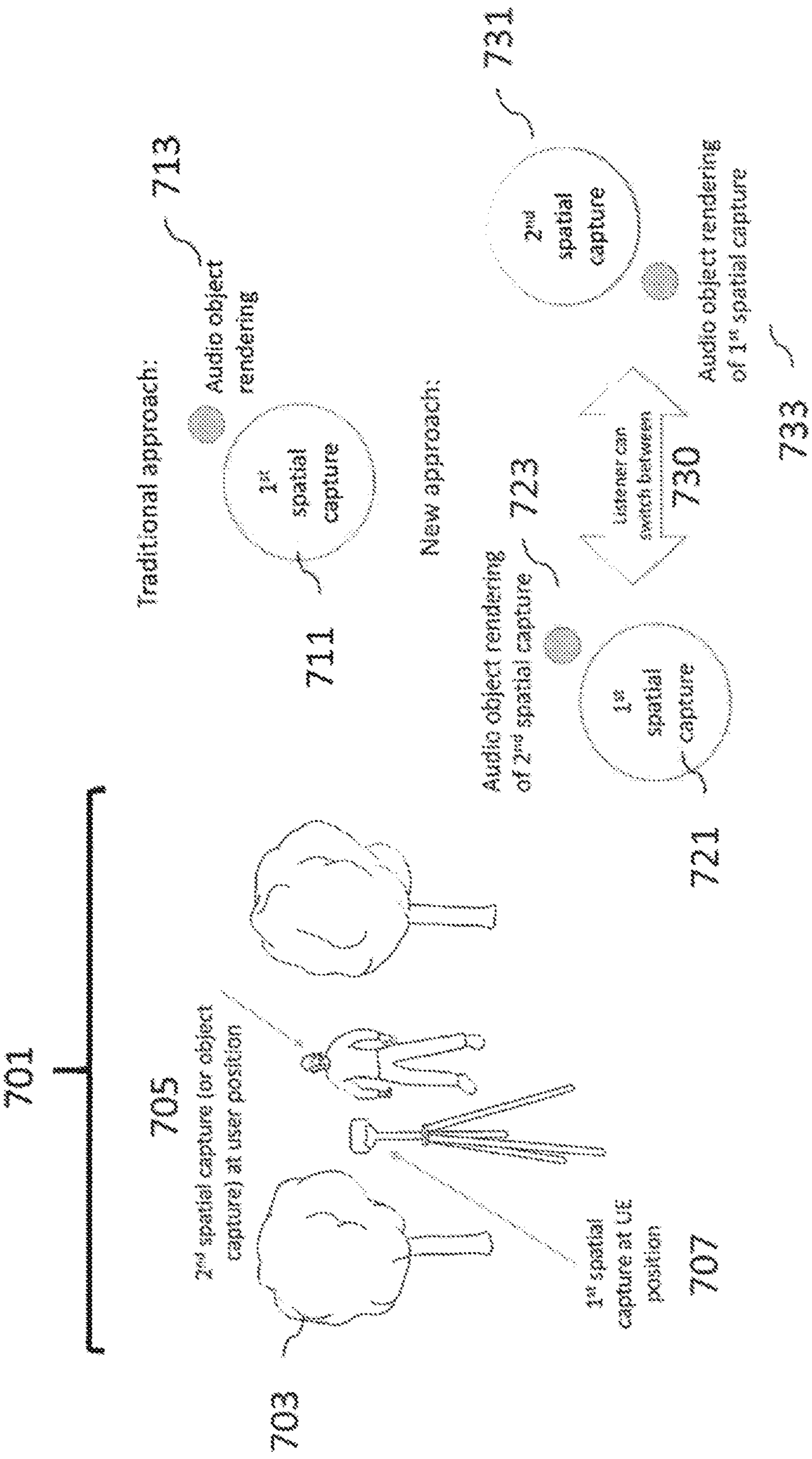
FIG. 7 shows an example operation scenario according to some embodiments.

For example, FIG. 7 shows a capture scene 701 within which there is a UE or similar capture device 707 implementing a spatial capture at a first (UE) position and a second capture device 705 implementing a second spatial capture (or object capture) at a second (user) position.

The conventional approach shown on the top right of FIG. 1 shows that audio object rendering 713 position and the 1*st* spatial capture scene 711. Thus, although the user could capture a spatial scene (e.g., in MASA format) using a multi-microphone UE and the user could use a close-up microphone or, e.g., a second UE that is able to connect with the "master" device in order to capture an audio object. These two inputs would be combined and provided to the IVAS encoder. In terms of listening experience, it would then be possible to listen to a combined rendering of the spatial audio (e.g., background audio) and the audio object (e.g., user voice).

Whereas by implementing embodiments as described herein the listener can switch 730 between a first option of audio object rendering of the second spatial capture 723 and the 1*st* spatial capture scene 721 or the second option of audio object rendering of the first spatial capture 733 and the second spatial capture scene 731. The IVAS codec can thus import as an IVAS object stream a second spatial audio representation. Thus, when the user captures a spatial audio scene using their UE, a wireless multimicrophone device or indeed a second UE connected to the "master" UE could capture a full spatial representation of the sound scene at the second position. This sound scene could now be encoded by the second device as an IVAS bitstream and provided to the second UE that could "act as a conference bridge", ingest the IVAS bitstream, and embed it as an IVAS object stream. It would then be delivered to the listener two spatial audio scenes. For example, the user could switch between them such that a mono downmix of each scene is provided as an audio object rendering for the other scene being rendered for the user.

While FIG. 6 shows an example of object stream nesting, it is to be understood that this is not the only mechanism of IVAS stream transport/packetization as enabled by the invention. FIG. 8 shows two examples of IVAS stream packetization according to some embodiments.

In some embodiments a look-up table specifying the packet contents can be employed. The look-up-table can be defined as 'Payload header', and it can be, e.g., an RTP payload header. This may include, e.g., the sizes of various blocks etc. What follows the header is the payload.

Figures 8A, 8B, 8C:
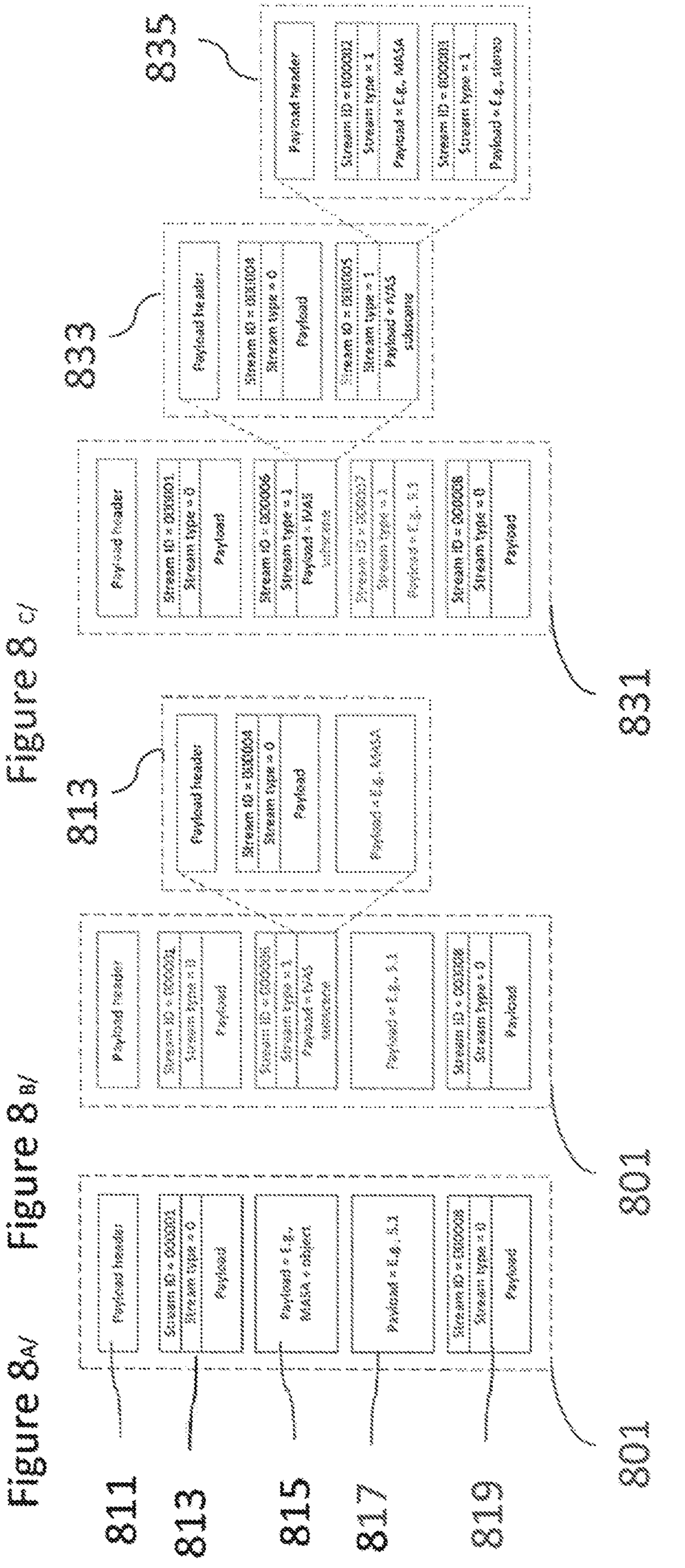
FIGS. 8*a* to 8*c* show example object packetizations according to some embodiments.

For example, as shown in FIG. 8 the datastream may include various IVAS object streams and IVAS content. Thus, the whole scene object stream 801 comprises a payload header 811 or look-up-table which can specify the packet contents. For example, as shown in FIG. 8A specifying a first object data stream 813 and the second object data stream 819 and payloads such as a first payload 815 (MASA and object) and second payload 817 (a 5.1 channel audio data).

In some embodiments as shown in FIG. 8C the data stream can include IVAS object streams only. Thus, the whole scene object stream 831 comprises a payload header or look-up-table which can specify the packet contents which includes an object data stream 833 which in turn may comprise nested object data streams 835 which in turn comprise further nested object data streams.

FIG. 8B presents a "hybrid" embodiment with payloads in the whole scene and nested object data streams 813.

There is an associated cost of nesting in the generation of additional 'Payload header' information and their parsing.

With respect to the decoder/renderer 105, 115, 125, 135. The decoder/renderer 105, 115, 125, 135 is configured to receive the various (IVAS) object data streams and decode and render the data streams in parallel.

In some embodiments the handling of nested audio object data streams can be performed for each sub-scene level individually and then combined at the higher level.

For example, with respect to the example shown in FIG. 6. Here, the decoding may begin with 'Stream ID=000002' and 'Stream ID=000003'. Thus, we have 'Stream ID=000005' decoded (as it is a container for the subscene). The decoder may then be configured to decode next 'Stream ID=000004'. After this, the other streams are decoded. This approach can have advantages, e.g., in memory consumption where certain memories may be freed between the subscene levels and thus the overall memory footprint is not defined by all the streams combined.

In such embodiments the rendering may be either carried out on the subscene level with a summation in the rendered domain, or a combined rendering may be carried out at the end of decoding.

In some embodiments the decoder is configured to launch a separate decoder instance for each subscene. Thus, for each 'Stream type=1', a separate IVAS decoder instance is initialised.

Figure 9:
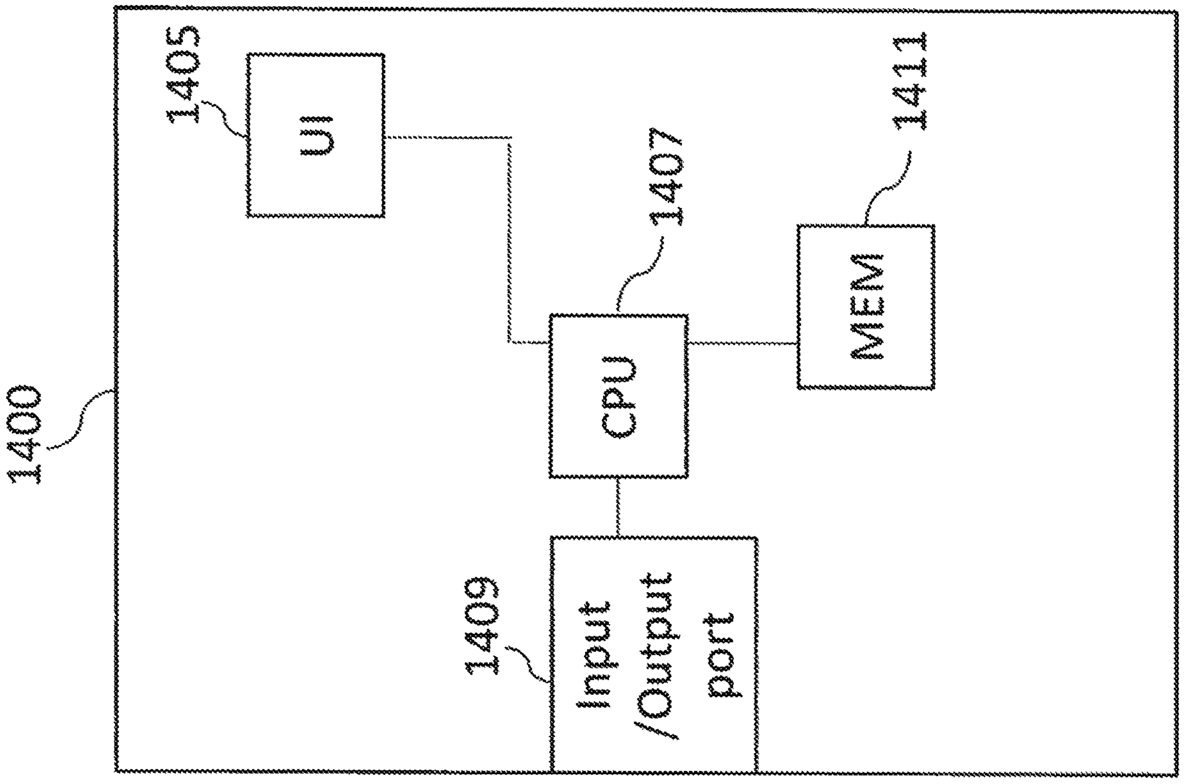
FIG. 9 shows an example device suitable for implementing the apparatus shown.

With respect to FIG. 9 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example, in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein, and generate a suitable audio signal format output by using the processor 1407 executing suitable code. The input/output port 1409 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed with the at least one processor, cause the apparatus at least to:

receive at least a first audio data stream and a second audio data stream, wherein at least one of the first audio data stream or the second audio data stream comprises a spatial audio stream configured to enable immersive audio during a communication;

determine a type of each of the first and second audio data streams to identify which of the received first and second audio data streams comprises the spatial audio stream;

process the second audio data stream with at least one parameter dependent on the determined type of the second audio data stream; and render the first audio data stream and the processed second audio data stream.

2. The apparatus as claimed in claim 1, wherein the second audio data stream is configured to comprise at least one further audio data stream, and wherein the at least one further audio data stream comprises a determined type, and the at least one further audio data stream is an embedded level audio data stream with respect to the second audio data stream.

3. The apparatus as claimed in claim 2, wherein the at least one further audio data stream comprises at least one further embedded level, wherein respective ones of the at least one further embedded level comprise at least one additional audio data stream with a determined type.

4. The apparatus as claimed in claim 1, wherein the second audio data stream is a master level audio data stream.

5. The apparatus as claimed in claim 1, wherein the first audio data stream and the second audio data stream are respectively further associated with at least one of:

a stream identifier configured to uniquely identify an audio data stream; or a stream descriptor configured to describe a type of the audio data stream.

6. The apparatus as claimed in claim 1, wherein the type of at least one of the first audio data stream or the second audio data stream is one of:

a mono audio signal type; or an immersive voice and audio services audio signal.

7. The apparatus as claimed in claim 1, wherein the at least one parameter is configured to define a room characteristic or scene description.

8. The apparatus as claimed in claim 1, where the at least one memory stores instructions that, when executed with the at least one processor, cause the apparatus at least to:

receive an additional audio data stream; and embed the additional audio data stream within one or other of the first audio data stream or the second audio data stream.

9. A method for an apparatus for immersive audio communication, the method comprising:

receiving at least a first audio data stream and a second audio data stream, wherein at least one of the first audio data stream or the second audio data stream comprises a spatial audio stream configured to enable immersive audio during a communication;

determining a type of each of the first and second audio data streams to identify which of the received first and second audio data streams comprises the spatial audio stream;

processing the second audio data stream with at least one parameter dependent on the determined type of the second audio data stream; and rendering the first audio data stream and the processed second audio data stream.

10. The method as claimed in claim 9, wherein the second audio data stream is configured to comprise at least one further audio data stream, and wherein the at least one further audio data stream comprises a determined type, and the at least one further audio data stream is an embedded level audio data stream with respect to the second audio data stream.

11. The method as claimed in claim 10, wherein the at least one further audio data stream comprises at least one further embedded level, wherein respective ones of the at least one further embedded level comprise at least one additional audio data stream with a determined type.

12. The method as claimed in claim 9, wherein the second audio data stream is a master level audio data stream.

13. The method as claimed in claim 9, wherein the first audio data stream and the second audio data stream are respectively further associated with at least one of:

a stream identifier configured to uniquely identify an audio data stream; or a stream descriptor configured to describe a type of the audio data stream.

14. The method as claimed in claim 9, wherein the type of at least one of the first audio data stream or the second audio data stream is one of:

a mono audio signal type; or an immersive voice and audio services audio signal.

15. The method as claimed in claim 9, wherein the at least one parameter is configured to define a room characteristic or scene description.

16. The method as claimed in claim 15, wherein the at least one parameter defining the room characteristic or scene description comprises at least one of:

direction;
direction azimuth;
direction elevation;
distance;
gain;
spatial extent;
energy ratio; or
position.

17. The method as claimed in claim 10, further comprising:

receiving an additional audio data stream; and embedding the additional audio data stream within one or other of the first audio data stream or the second audio data stream.

18. The method as claimed in claim 15, wherein the at least one parameter is generated based on spatial audio capture.

19. The apparatus as claimed in claim 7, wherein the at least one parameter defining the room characteristic or scene description comprises at least one of:

direction;
direction azimuth;
direction elevation;
distance;
gain;
spatial extent;
energy ratio; or
position.

20. The apparatus as claimed in claim 7, wherein the at least one parameter is generated based on spatial audio capture.

* * * * *